US007293256B2

(12) United States Patent
Crawford

(10) Patent No.: US 7,293,256 B2
(45) Date of Patent: Nov. 6, 2007

(54) DEBUGGER CAUSALITY SYSTEM AND METHODS

(75) Inventor: Brian Robert Crawford, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 800 days.

(21) Appl. No.: 10/174,359

(22) Filed: Jun. 18, 2002

(65) Prior Publication Data

US 2003/0233636 A1 Dec. 18, 2003

(51) Int. Cl.
*G06F 9/44* (2006.01)
(52) U.S. Cl. ............... 717/124; 717/127; 717/128; 717/129; 717/131
(58) Field of Classification Search ........ 717/124–131; 714/38
See application file for complete search history.

(56) References Cited

U.S. PATENT DOCUMENTS

| | | | | |
|---|---|---|---|---|
| 6,026,362 | A * | 2/2000 | Kim et al. | 705/1 |
| 6,249,907 | B1 * | 6/2001 | Carter et al. | 717/129 |
| 6,681,384 | B1 * | 1/2004 | Bates et al. | 717/129 |
| 6,760,903 | B1 * | 7/2004 | Morshed et al. | 717/130 |
| 2003/0056200 | A1 * | 3/2003 | Li et al. | 717/128 |

OTHER PUBLICATIONS

"Experiences with Building Distributed Debuggers" by Michael S. Meier, et al., Jan. 1996 Proceedings of the SIGMETRICS symposium on Parallel and distributed tools, pp. 70-79.*

"Debugging Concurrent Programs", Charles E. McDowell et al., ACM Computing Surveys, vol. 21, No. 4, Dec. 1989, pp. 593-622.*
"HotWire—A Visual Debugger for C++", pp. 1-14, Chris Laffra and Ashok Malhotra, Proceeding of 1994 USENIX/C++, Apr. 13, 1994.*
"Debugging Custom Microsoft Windows CE 3.0-based Systems", Microsoft Corporation, Apr. 2000.*
Abramson, D. et al., "Relative Debugging and its Application to the Development of Large Numerical Models", *School of Computing and Information Technology, Griffith University, Brisbane*, QLD 411 Australia; *Mathematics and Computer Science Division, Argonne National Laboratory*, Argonne, IL 60439, U.S.A., pp. 1-12.

(Continued)

*Primary Examiner*—Wei Zhen
*Assistant Examiner*—Chih-Ching Chow
(74) *Attorney, Agent, or Firm*—Woodcock Washburn LLP

(57) ABSTRACT

A debugger casuality feature is provided. Debugger casuality is the ability of a cooperating debugger to associate an ordered set of casuality related threads, possibly originating from different processes, as a logical thread of execution. In an illustrative implementation, systems and methods are provided allowing for the execution and management of debugger casuality within a computing environment. In the contemplated implementation casuality hooks are provided for integration with calls found in software operating in a computing environment. The hooks help attach a cooperating debugger to be able to step through a call executing in the computing environment. The casuality hooks provide the ability to step between logically related physical threads executing in a given computing environment. The physical threads ranging from single process, multi-threaded applications to multi-machine, multi-process systems. Furthermore, debugger casuality provides the ability to show the relationship between physical threads executing in a given computing environment.

21 Claims, 5 Drawing Sheets

OTHER PUBLICATIONS

Abramson, . et al., "Relative Debugging for Parallel Systems", *Department of Digital Systems, Monash University, Clayton,* VIC 3168, PI-C-1-P1-C-8.

Caswell, D. et al., "Implementing a Mach Debugger for Multithreaded Applications", *Proceedings of the Winter 1990 USENIX Technical Conference andExhibition*, Jan. 1990, Washington D.C., 1-12.

Dionne, C. et al., "A Taxonomy of Distributed Debuggers Based on Execution Replay", *Proceedings of the International Conference on Parallel and Distributed Processing Techniques and Applications (PDPTA'96)*, Aug. 9-11, 1996, 12 pages.

Sekita, D. et al., "A Runtime Debugger for Massively Parallel Programming", *RWCP Massively Parallel Systems MRI Laboratory*, 3 pages.

* cited by examiner

DEBUGGER CAUSALITY SYSTEM AND METHODS

FIELD OF THE INVENTION

This invention relates in general to the field of causality between logically related points of a computing environment. More particularly, this invention relates to identifying and managing causality between various elements of a computing environment when debugging.

BACKGROUND OF THE INVENTION

Efforts surrounding the development of computer software are often met with significant obstacles including the identification and correction of software "bugs" (e.g. errant software code). These "bugs" effect the operation and intended function(s) of the computer software and require significant expenditure of resources (e.g. time and labor) to find a correct. The practice of finding "bugs" is known as software "debugging". Debugging takes on many forms, from the simple or facile, such as, manually reviewing software code in an effort to find the errant code, to the complex and automated, wherein another computer application, known as a debugger, operates on and executes software code in a "step by step" basis to assist developer in identifying the bugs.

Currently, debugging applications are equipped to execute process threads. In operation, the steps of the processes are executed on a step-basis so that the process execution may be observed and subsequently modified if the process is not executing properly or the process is not performing the intended function(s)/operations(s). In the context of a computing environment executing one thread, current practices are adequate to assist in the detection of bugs and serve developers and administrators, alike, in correcting outstanding execution, function, and/or operation problems.

However, current practices do not generally allow for the debugging of logically related processing threads that range from single process, multi-thread applications to multi-machine, multi-process systems. Specifically, current practices do not contemplate stepping between logically related physical threads and/or do not provide the ability to show the relationship (e.g. in the form of the call stack) between physical threads. With these added abilities, more complicated multi-process, multi-thread environments may be more easily debugged.

From the foregoing, it is appreciated that there exists a need for a system and methods that ameliorate the shortcomings of existing practices.

SUMMARY

The system and methods of the present invention disclose an implementation of debugger causality, that is, the ability to track causal relationships between physical threads of execution in a running system. In an illustrative implementation, pre-defined code segments known as "hooks" are attached throughout software code to identify when one or more portions of the software code perform a call (e.g. a function call, an API call, server query, etc.). In the contemplated implementation the hooks are provided as a pair such that there is a beginning hook and an ending hook. The beginning hook identifies the portion or portions of software code that initiate a given call and the ending hook identifies where in the software code the destination of the given call. Furthermore, the hooks are seamlessly integrated within the software code to not affect the underlying operation of the software code itself.

In operation, software code is populated with debugger causality hooks at the appropriate portion or portions across one or more processing threads. During debugging, a cooperating debugger tracking the execution of the software code (e.g. software code may be executed by a computing environment operating system, interpreter, virtual machine, runtime, etc.) recognizes the causality hooks and proceeds to execute the call along the process thread to indicate to whomever is debugging the exact nature and location of each call. Further, in the contemplated implementation of the systems and methods described herein, the execution causality hooks may be tracked and logged by a cooperating debugger as part of debugging in an effort to identify the problematic area or areas of the process thread(s).

Another aspect of the invention contemplates the use of causality hooks to visualize the logical chain of execution across a thread boundary. This ability assists developers and administrators to determine if one or more intended functions and/or operations are being realized by the software/system.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF AN ILLUSTRATIVE IMPLEMENTATION

Overview

Generally, debugger causality is the ability to track the causal relationships between physical threads of execution in a running system. These relationships allow the "debugger" (e.g. software developer, debugging computing application) to show the logical thread of execution across physical threads, processes, and machines. Furthermore, debugger causality allows the reconstruction of the call stack (e.g. function calls in a computer software application) of that logical thread at any given point in the thread's lifetime. In operation, debugger causality allows for the stepping between logically related physical threads by providing hooks for remoting services. In operation, when the hook is notified that an outgoing call is occurring, and the participating user operating a debugger has indicated to step the call, the debugger causality of the systems and methods described herein provides enough information to the remoting service to piggy-back with the call to attach the debugger to the receiver of the call and step to the receiving function.

Debugger causality also provides the ability to show the relationship between physical threads by building transition notification to track and store the relationships between physical threads. Each logical thread of execution is assigned a causality identifier that is used for all its transitions across physical threads. This causality identifier along with the order of each transition and some stack information, is used to collect all causally related physical threads, order them, and extract the relevant parts of each physical thread's call stack to provide a logical call stack.

Exemplary Computing Environment

Figure 1:
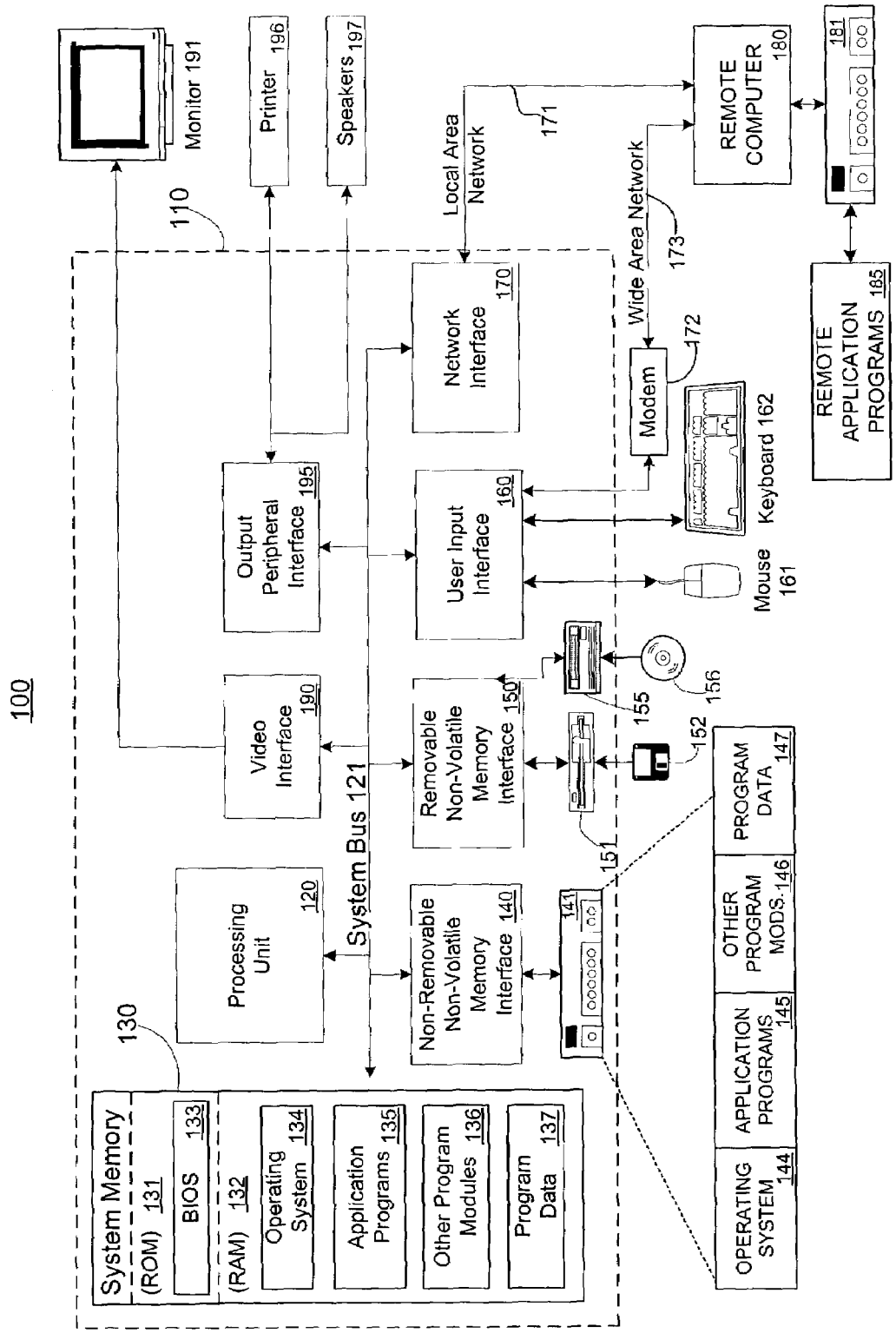
FIG. 1 is a block diagram showing an exemplary computing environment for use by the systems and methods described herein.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 2:
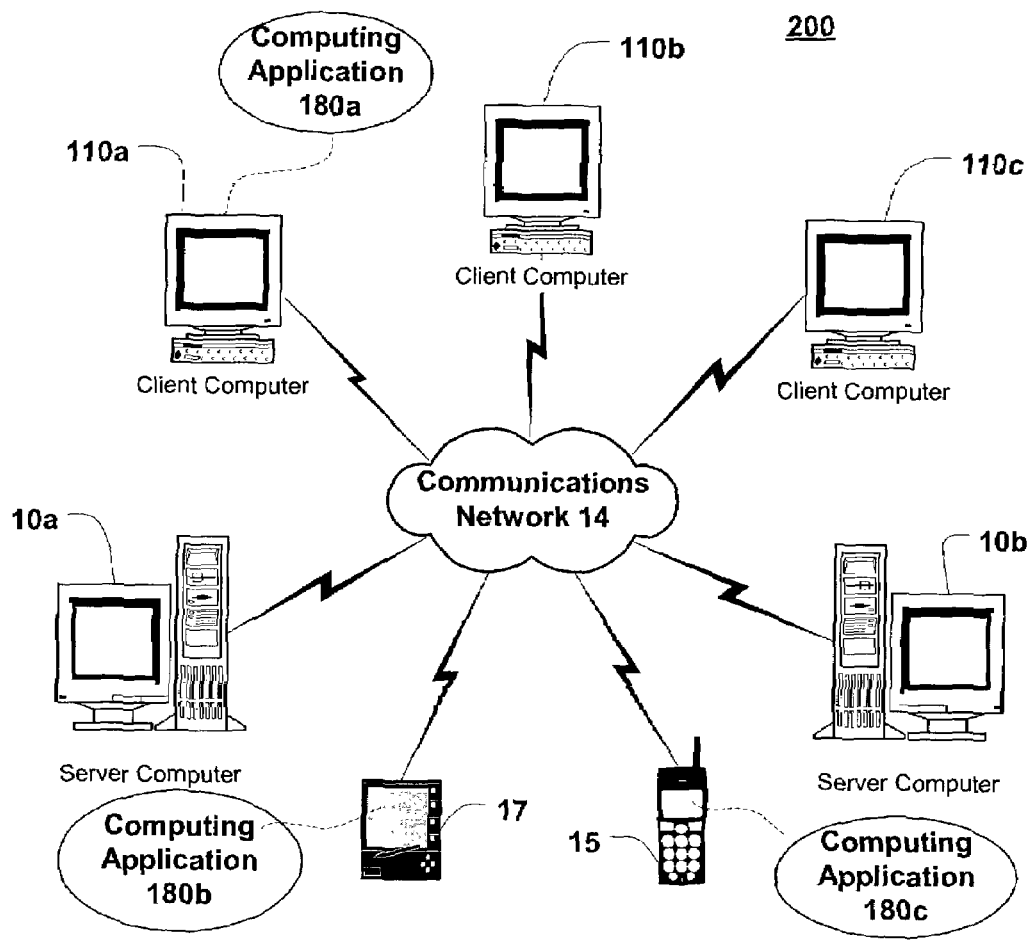
FIG. 2 is a block diagram showing an exemplary computer network environment for use by the systems and methods described herein.

FIG. 2 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, etc., such as a portable computer, handheld computer 17, mobile telephone 15, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 180 and with connections or access to various types of storage elements or objects, across which files may be stored or to which portion(s) of files may be downloaded or migrated. Any server 10a, 10b, etc. may be responsible for the maintenance and updating of a database (not shown) in accordance with the systems and methods described herein, such as a database (not shown) for storing classification information, music and/or software incident thereto. Thus, the present invention can be utilized in a computer network environment having client computers 110a, 110b, etc. for accessing and interacting with a communications network 14 and server computers 10a, 10b, etc. for interacting with client computers 110a, 110b, etc. and other devices 15 and 17 and databases (not shown).

Generally, communications network 14 comprises any of a wireless LAN, a fixed wire LAN, a wireless WAN, a fixed wire WAN, a wireless intranet, a fixed wire intranet, a wireless extranet, a fixed wire extranet, a wireless peer-to-peer communications network, a fixed wire peer-to-peer communications network, the wireless Internet, and the Internet.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4)

centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of .NET's languages and services, and in other distributed computing frameworks as well.

Debugger Causality Implementation

Generally, debugger causality is the ability to track the causal relationships between physical threads, possibly from different processes, of execution in a running system. In operation, debugger causality may be divided into various levels of causality. For example, a first level may contemplate the ability to auto-attach and step in. In this implementation, the causality provides no logical stack between physical threads, processes, or machines, but does provide the ability to step from one physical thread into another and auto-attach a cooperating debugger to the destination process, if the cooperating debugger is not already attached. A second level may contemplate the ability to track the causality on a step in. Building on the previously described level, the system tracks the causal relationship when stepping across physical threads, processes, or machines and provides a logical call stack of these relationships. A third level may contemplate tracking causality across all components in the debugging session. Where the second described level only provides causality when stepping, the third level provides causality for all transitions between components that are part of the debugging session. Whenever the debugger stops at a breakpoint or exception, the debugger can provide a logical thread and call stack within the components being debugged. A fourth level contemplates to track causality across all components in the running system. At the highest level of causality, every transition between every component of the running system (whether or not it's being debugged) would be tracked. At any point, a debugger can be attached to any part of the running system and a logical thread call stack view can be obtained across all components in the running system.

It is appreciated that although four levels of causality are herein described, that the inventive concepts of the systems and methods described herein are not exclusively limited to these levels as they are merely offered as illustrations of varying implementations of the present invention.

In an illustrative implementation, debugger causality operation places a requirement that a remoting service to notify the debugger of transitions that occur between components. In the contemplated implementation, there may be four transitions that a cooperating debugger requires for tracking causality. These transitions include but are not limited to when the call leaves the local thread; when the call enters a remote thread; when the call returns from the remote thread; and when the call returns back to the local thread. Additionally, in a particular implementation it might be required that the remoting service to allow the debugger to piggy-back information on the calls between the local and remote threads (e.g. client and server).

The implementation of the notifications from the remoting service to the cooperating debugger occurs as follows. First, the remoting service instantiates the NotifyConnection coclass and gets an INotifyConnection2 interface. It then calls INotifyConnection2:: RegisterNotifySource to get an INotifySink2 interface where it can notify the cooperating debugger of the four transitions. When each of the transitions occur, the remoting service calls the appropriate method on INotifySink2 to notify the debugger of the transition: OnSyncCallOut, OnSyncCallEnter, OnSyncCallExit, and OnSyncCallReturn. When either OnSyncCallOut or OnSyncCallExit is called, the cooperating debugger can provide a buffer of data to be piggy-backed along with the call. When either OnSyncCallEnter or OnSyncCallReturn is called, the remoting service passes the buffer of data from the call to the debugger.

Once the cooperating debugger is notified of the four transition points between client and server, it can proceed to perform the operations of debugger causality: stepping between logically related physical threads, and displaying the logical call stack for these related threads.

Figure 3:
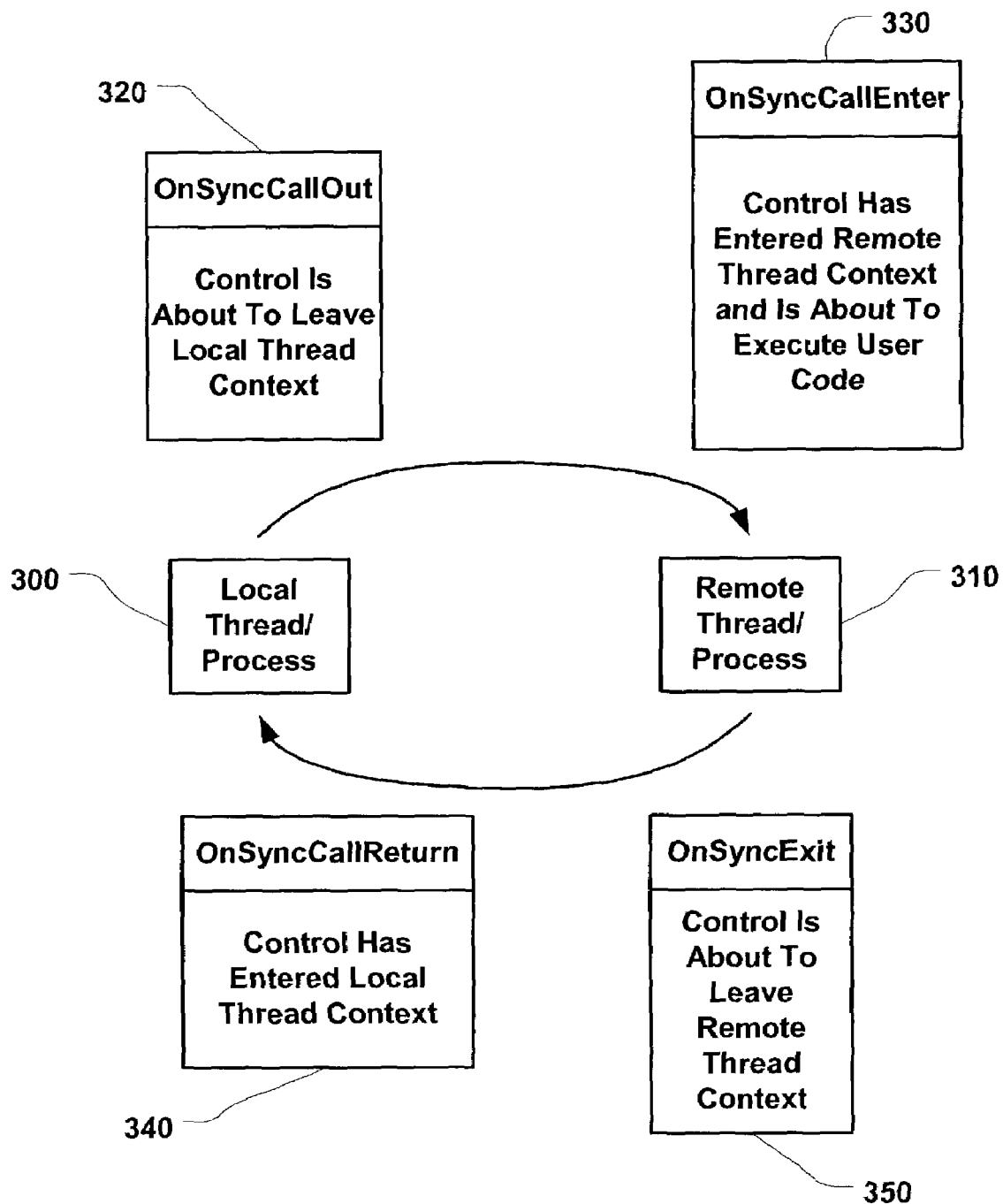
FIG. 3 is a block diagram showing the interaction of exemplary components operating in a an exemplary computer network environment.

As shown in FIG. 3, debugger causality may be performed across two process/threads (local thread 300 and remote thread 310) operating remotely from each other. To perform stepping between logically related physical threads, the remoting service and debugger perform the following operations. Before the outgoing call leaves the client, the remoting service calls the debugger via OnSyncCallOut 320. The debugger creates a buffer that describes the source of the call, a causality identifier (if this is the first outgoing call made on this thread, then a new causality identifier is created; otherwise, the causality identifier received from a previous OnSyncCallEnter 330 is used), and some information about the current user action (i.e. whether the user is stepping the call or not). The buffer is returned to the remoting service and the remoting service piggy-backs the buffer along with the call to the server. Before the remote thread dispatches the call, the remoting service will call OnSyncCallEnter 330 and pass the buffer to the debugger. The cooperating debugger will use the information in the buffer to attach to the remote process, if not already attached and determine if the user action was to step the call and perform a step into the call on the remote process. This process of stepping from local thread to remote thread can be chained together (e.g. an exemplary client A can call exemplary server B, exemplary client (that was the exemplary server B) B can call exemplary server C, etc.). Stepping back from remote threads to local threads is performed in a similar manner. The remoting service will call OnSyncCallExit 350 before the call returns back to the client. Again, the cooperating debugger will create a buffer that describes the source of the returning call, the causality identifier, and information about the current user action. The remoting service will piggy-back this buffer on the returning call and call OnSyncCallReturn (giving the debugger the buffer) before dispatching the returning call in the client. The debugger will use the information in the buffer to complete the step in the client.

Comparatively, to build and display a logical call stack that shows the relationship between causally related physical threads, the cooperating debugger performs the following operations. As the remoting service notifies the cooperating debugger of each transition, the cooperating debugger maintains a stack of "causality packets" for each logical thread that describe the transitions between physical threads and information such as the type of the transition point, context about the physical thread (thread, process, machine, etc.), and call stack information. Causality packets are pushed and popped from this stack depending on the type of transitions that occur on the physical threads that make up this logical thread. Specifically, OnSyncCallOut 320 and OnSyncCallEnter 330 push causality packets (not shown) on the stack; OnSyncCallExit 350 and OnSyncCallReturn 360 pop causality packets (not shown) from the stack. New causality identifiers are only ever created when OnSyncCallOut 320 is received by the cooperating debugger. The decision about whether to create a new causality identifier or use an existing one (stated differently, when a new logical thread is created or added to) is made using the following exemplary algorithm.

Specifically, a new causality identifier is assigned (i.e. a new logical thread is created) when the physical thread identified in OnSyncCallOut 320 is not part of an OnSyncCallEnter 330 causality packet (not shown) on the top of any of the logical thread's causality stacks. The causality identifier is maintained when the physical thread identified in OnSyncCallOut 320 is part of an OnSyncCallEnter 330 causality packet on the top of one of the logical thread's causality stacks. To build and display a logical call stack, the cooperating debugger simply traverses the causality stack for a particular logical thread, extracts the portion of each physical thread's call stack identified by each causality packet and merges the results together in the order from the causality stack.

It is understood that although an exemplary process has been described to realize the call stack tracking operation of debugger causality, that such process is merely exemplary and the inventive concepts described herein are not limited by such example. Rather, the present invention contemplates various processes having modifiable steps for performing call stack tracking.

Figure 4:
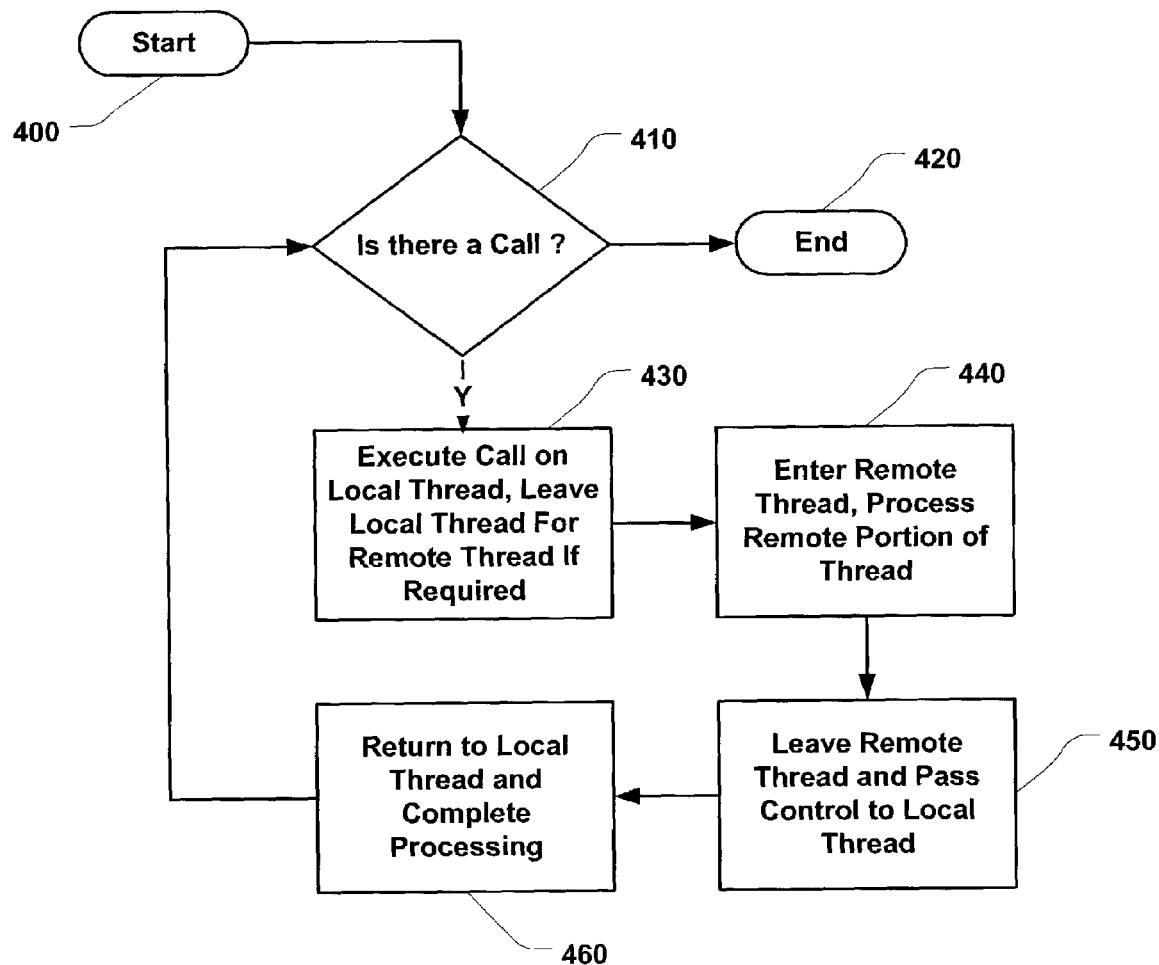
FIG. 4 is a flow diagram showing the processing performed when performing debugging causality.

FIG. 4 shows the processing performed when performing the stepping operation of debugger causality. As shown, processing begins at block 400 and proceeds to block 410 where a check is performed to see if a call by a thread has been made. If there is not call processing terminates at block 420. However if at block 410 it is determined that a call has been made, processing proceeds to block 430 where the call is executed on the local thread and the local thread is left if one ore more operations on a remote thread is required. From there, processing proceeds to block 440 where the remote thread is entered and the remote thread portions are executed. Processing then proceeds to block 450 where the remote thread is left and control is passed back to the local thread. From there, processing proceeds to block 460 where the local thread is returned to and processing of the local thread is completed. Processing then reverts to block 410 and proceeds there from.

Figure 5:
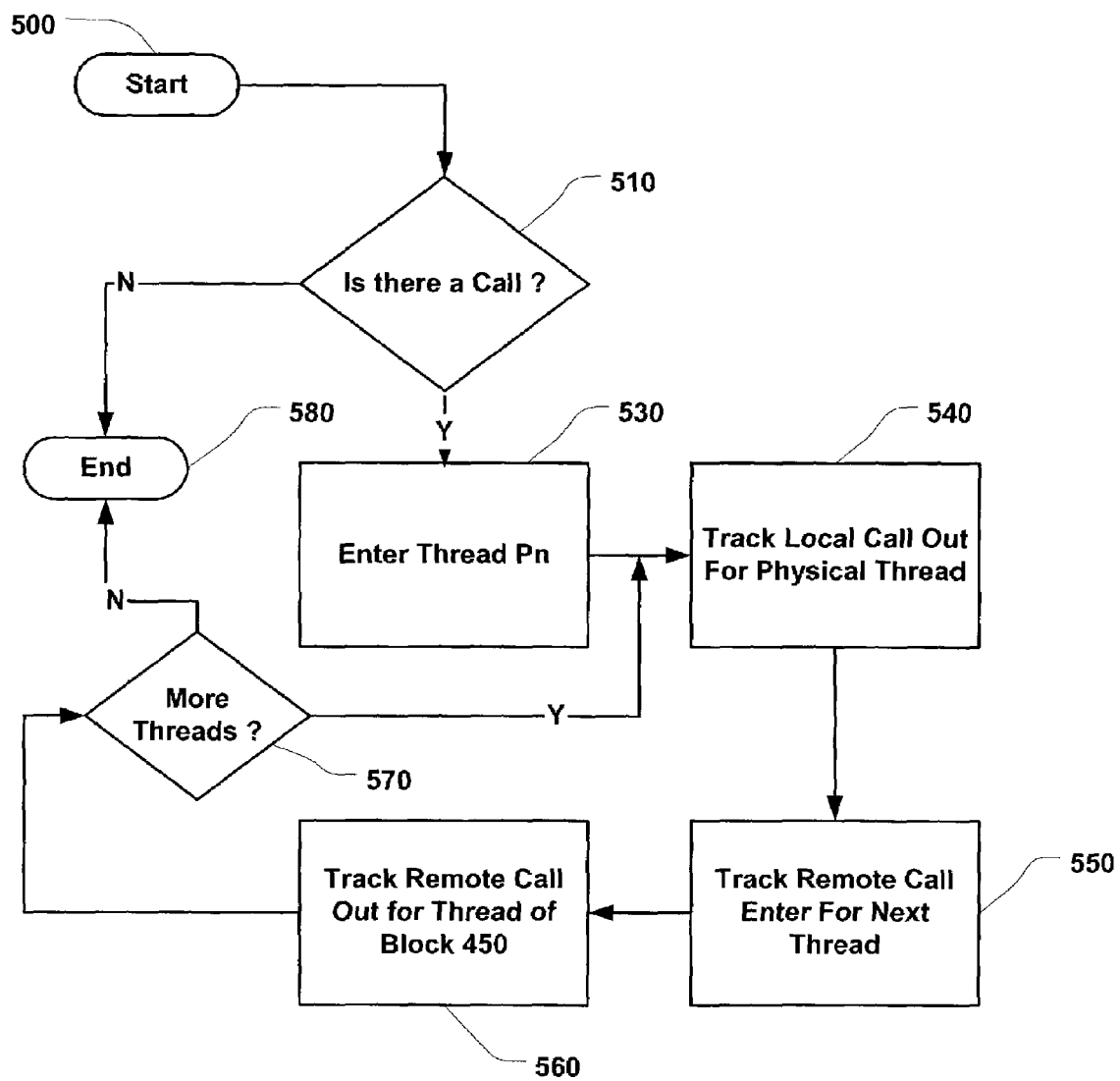
FIG. 5 is a flow diagram showing the processing performed when showing the call stack between cooperating elements of an exemplary software application.

FIG. 5 shows the processing performed when performing the call stack display of debugger causality. As shown, processing begins at block 500 and proceeds to block 510 where a check is performed to determine if a call has been made. If a call has not been made processing terminates at block 580. If however, it is determined at block 510 that a call has been made, processing proceeds to block 530 where the first thread is entered into (e.g. the thread of an exemplary client computer A is entered). Processing proceeds to block 540 where the local thread to a remote thread is tracked. Subsequently, the remote thread entering event is tracked at block 550 and the calling out of the remote thread is tracked at block 560. A check is then performed at block 570 to determine if any additional threads/processes need to be tracked. If there are processing reverts to block 540 and proceeds there from. However, if no more threads/processes requiring tracking processing terminates at block 580.

As mentioned above, while illustrative implementations of the systems and methods described herein have been described in connection with various computing devices and network architectures, the underlying concepts may be applied to any computing device or system in which it is desirable to perform and execute debugger causality. Thus, the techniques for debugger causality in accordance with the systems and methods described herein may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, and a storage medium readable by the processor (including volatile and non-volatile memory and/or storage elements). One or more programs that may utilize the web page content protection aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the content protection capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the illustrative implementations of the various figures, it is to be understood that other similar implementations may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the systems and methods described herein may be implemented in or across a plurality of processing chips or devices, and storage may similarly be effected across a plurality of devices. Therefore, the systems and methods described herein should not be limited to any single implementation, but rather should be construed in breadth and scope in accordance with the appended claims.

What is claimed is:

1. A system providing debugging causality operating in a computing environment comprising:
   a processor having memory and an operating system;
   at least two software hooks, said software hooks operating on calls within software code that indicate an origination of said calls and a destination of said calls;
   means for interpreting said software hooks at run time of said software code to step through said calls irrespective of where said calls originate and terminate in said computing environment;
   means for tracking a causal relationship, in the form of call stack information, between process threads; and
   means for building and displaying a logical call stack to show said causal relationship between said process threads, wherein means for building and displaying comprises means for traversing a causality stack for a logical thread, extracting a portion of a call stack identified by a causality packet, and merging said extracted portion in order from said causality stack.

2. The system as recited in claim 1, wherein said software hooks provide data comprising any of: an origination of a call, a destination of said call, steps to perform to jump back and forth between said origination of said call and said destination of said call.

3. The system as recited in claim 1, wherein said means for interpreting said software hooks comprises a debugger computing application.

4. The system as recited in claim 1, wherein said software hooks are integrated within said software code.

5. The system as recited in claim 4, wherein said software hooks do not interfere with the operations of said software code.

6. The system as recited in claim 1, wherein said software code comprises any of a single process-multi-threaded computing application and multi-machine-multi process computing application.

7. The system as recited in claim 6, wherein said debugger causality provides stepping between logically related process threads.

8. The system as recited in claim 1, wherein said software hooks cooperate with remoting services operating in remote computing environments using a communications network.

9. A method to follow calls between logically related process threads, comprising the steps of:
   providing hooks for remoting services, said hooks providing information to cooperating debuggers as to a manner of attaching to at least one call of said logically related process threads;
   interpreting and executing said hooks by said cooperating debuggers to step through said at least one call of said logically related process threads;
   tracking a causal relationship, in the form of call stack information, between said process threads; and
   building and displaying a logical call stack to show said causal relationship between said process threads, wherein building and displaying comprises traversing a causality stack for a logical thread, extracting a portion of a call stack identified by a causality packet, and merging said extracted portion in order from said causality stack.

10. The method as recited in claim 9, further comprising integrating said hooks with said at least one call of said logically related process threads.

11. A tangible computer readable medium having computer readable instructions to instruct a computer to perform the method of claim 9.

12. A method to illustrate the logical connection of process threads of a computing environment comprising the steps of:
   providing hooks for remoting services, said hooks providing information to cooperating debuggers as to a manner of attaching to at least one call of said logically related process threads;
   interpreting and executing said hooks by said cooperating debuggers to step through said at least one call;
   associating a causality identifier that indicated a transition of at least one call across one more process threads;
   tracking said causality identifier when debugging said at least one call by said cooperating debuggers to provide a logical call stack;
   tracking a causal relationship, in the form of call stack information, between said process threads; and
   building and displaying a logical call stack to show the relationship between said process threads, wherein building and displaying comprises traversing a causality stack for a logical thread, extracting a portion of a call stack identified by a causality packet, and merging said extracted portion in order from said causality stack.

13. A tangible computer readable medium having computer readable instructions to instruct a computer to perform the method of claim 12.

14. A method providing debugger causality for calls executing across a plurality of process threads comprising the steps of:
   notifying a cooperating debugger of call transitions, wherein call transitions comprise any of: when a call leaves an originating thread, when said call enters a destination thread, when said call returns from said destination thread, and when said call returns back to said originating thread;
   creating a buffer to describe a source of said call, a causality identifier, and a function of said cooperating debugger;
   passing said created buffer to a remoting service which piggy-backs said created buffer and said call to said destination thread;
   passing said created buffer to said cooperating debugger, wherein said cooperating debugger uses information in said buffer to attach said destination thread and to execute portions of said originating and said destination threads;
   tracking a causal relationship, in the form of call stack information, between process threads; and building and displaying a logical call stack to show said causal relationship between said process threads, wherein building and displaying comprises traversing a causality stack for a logical thread, extracting a portion of a call stack identified by a causality packet, and merging said extracted portion in order from said causality stack.

15. The method as recited in claim 14, wherein said created buffer is for use by said cooperating debugger when returning from said destination thread to said originating thread.

16. The method as recited in claim 14, wherein said remoting service monitors a passing back and forth of control from origination points and destination points of said call, wherein said origination points of said call originating on a client computing device, and said destination points of said call operating on at least one server computing device.

17. A method to build a logical stack showing the relationship between causally related process threads comprising the steps of:
monitoring transitions from a remoting service by a debugger application, wherein said transitions are offered by following hooks associated with at least one call operating between a plurality of process threads;
storing causality packet stacks by said debugger application for each logical thread, wherein said stack comprises information indicative of any of: descriptions about transitions between process threads, transition point information, context about said process thread, and stack information;
updating said causality packet stacks by adding or deleting causality packets dependent on said transitions;
tracking a causal relationship, in the form of call stack information, between process threads; and
building and displaying a logical call stack to show said causal relationship between said process threads, wherein building and displaying comprises traversing a causality stack for a logical thread, extracting a portion of a call stack identified by a causality packet, and merging said extracted portion in order from said causality stack.

18. The method as recited in claim 17, further comprising displaying said causality packets by said debugger application to participating users.

19. A tangible computer readable medium having computer readable instructions to instruct a computer to perform the method of claim 17.

20. A tangible computer readable medium having computer readable instructions to instruct a computer to perform the steps of:
integrating hooks with software code for association to at least one call, said hook providing information indicative of said call origination and destination; and
executing a debugger computing application on said software code, said debugger computing application interpreting and processing said hooks to show a logical connection between points of said call, track a causal relationship, in the form of call stack information, between process threads, and build and display a logical call stack to show said causal relationship between said process threads, comprising traversing a causality stack for a logical thread, extracting a portion of a call stack identified by a causality packet, and merging said extracted portion in order from said causality stack.

21. The tangible computer readable medium as recited in claim 20, further comprising storing information about said logical connection of said points of said call at run time.

* * * * *